United States Patent [19]
Stouffer et al.

[11] Patent Number: 5,763,104
[45] Date of Patent: Jun. 9, 1998

[54] PRODUCTION OF POLY(TRIMETHYLENE TEREPHTHALATE)

[75] Inventors: Jan M. Stouffer, Hockessin; Elwood Neal Blanchard, Wilmington, both of Del.; Kenneth Wayne Leffew, Kennett Square, Pa.

[73] Assignee: E. I. du Pont de Nemours & Company, Wilmington, Del.

[21] Appl. No.: 764,492

[22] Filed: Dec. 12, 1996

Related U.S. Application Data

[60] Provisional application No. 60/009,123 Dec. 22, 1995.

[51] Int. Cl.$^6$ .................. C08F 6/00; C08J 3/00
[52] U.S. Cl. .................. 528/503; 525/437; 525/444; 528/298; 528/300; 528/302; 528/307; 528/308; 528/503
[58] Field of Search .................. 525/437, 444; 528/503, 298, 300, 302, 307, 308

[56] References Cited

U.S. PATENT DOCUMENTS

| | | | |
|---|---|---|---|
| 4,165,420 | 8/1979 | Rinehart | 526/63 |
| 5,540,868 | 7/1996 | Stouffer et al. | 264/13 |
| 5,633,018 | 5/1997 | Stouffer et al. | 425/8 |

FOREIGN PATENT DOCUMENTS 578097   9/1943   United Kingdom.

OTHER PUBLICATIONS

H.H. Chuah et al., Corterra Poly. (Trimethylene Terephthalate), A New Performance Carpet Fiber, *IFJ*, 50–52, Oct. 1995.

*Primary Examiner*—Samuel A. Acquah

[57] ABSTRACT

Disclosed herein is a novel crystalline form of low molecular weight poly(trimethylene terephthalate). This crystalline form may be produced from molten or glassy low molecular weight poly(trimethylene terephthalate) material by means of rapid heat transfer to or from the material. The poly(trimethylene terephthalate) composition is suitable for use as a starting material for solid-state polymerization in order to produce polymers of higher molecular weight.

25 Claims, 3 Drawing Sheets

PRODUCTION OF POLY(TRIMETHYLENE TEREPHTHALATE)

FIELD OF THE INVENTION

This application claims the priority benefit of U.S. Provisional Application Ser. No. 60/009,123, filed Dec. 22, 1995.

This invention concerns a process for producing a low molecular weight poly(trimethylene terephthalate) which can be used in solid-state polymerization to obtain a higher molecular weight polymer. A novel crystalline form of the polymer is also disclosed.

TECHNICAL BACKGROUND

Poly(trimethylene terephthalate), herein abbreviated 3GT, may be useful in many materials and products in which polyesters are currently used, for example, films, carpet fibers, textile fibers, miscellaneous industrial fibers, containers and packaging. For use in carpet fibers, 3GT may offer advantages because of built-in stain resistance and superior resiliency. See, for example, an article by H. H. Chuah et al., in IFJ (October 1995) on pages 50–52 concerning poly (trimethylene terephthalate) as a new performance carpet fiber.

British Patent 578,097 disclosed the synthesis of poly (trimethylene terephthalate) in 1941. The polymer, however, is not available commercially. There is a lack of published literature on processes for producing the polymer on other than a laboratory scale.

Many of the proposed uses for 3GT require a polymer of relatively high molecular weight. Other polyesters such as poly(ethylene terephthalate), referred to herein as PET or 2GT, have been commercially made by increasing, either in melt and/or solid-state polymerization, the molecular weight of a lower molecular weight polymer, sometimes referred to as a prepolymer or oligomer. In general, melt polymerizations require higher temperatures, which are more likely to cause polymer decomposition and require expensive equipment. Solid-state polymerizations, in contrast, are usually run at somewhat lower temperatures. Solid-state polymerizations can also have the advantage, compared to melt polymerizations, that very high molecular weights, where melt viscosities would be extremely high, are more readily obtained. In commercial use, however, solid-state polymerizations may be relatively slow.

In the case of PET, solid-state polymerizations usually require that lower molecular weight polymer, in the form of particles or pellets, undergo a relatively lengthy crystallization process prior to being polymerized in the solid-state, in order that the particles do not agglomerate in the solid-state reactor. The crystallization process for PET is usually accomplished by annealing the lower molecular weight polymer at an elevated temperature at which the desired crystallization occurs.

It would be desirable to obtain a higher molecular weight 3GT polymer without having to expose a lower molecular weight 3GT polymer to lengthy and problematic crystallization and annealing steps.

SUMMARY OF THE INVENTION

This invention concerns a composition, comprising, poly (trimethylene terephthalate) having an average apparent crystallite size of at least 18.0 nm determined from the 010 reflection.

This invention also concerns a process for crystallizing poly(trimethylene terephthalate), comprising cooling at a rate sufficient to lower the temperature of a molten poly (trimethylene terephthalate) mass or, alternatively, heating at a rate sufficient to raise the temperature of a glassy poly (trimethylene terephthalate) mass to a temperature of about 60° C. to about 190° C. This process produces a crystalline poly(trimethylene terephthalate) having an average apparent crystallite size of 18.0 nm or more.

More particularly, disclosed herein is a process for the crystallization of pellets of poly(trimethylene terephthalate), comprising:

heating a glassy poly(trimethylene terephthalate) mass to a bulk average temperature of 60° C. to about 190° C. within a specified maximum period of time and, furthermore, maintaining the mass at that bulk average temperature for a specified minimum period of time; or cooling a molten mass of a poly(trimethylene terephthalate) so that the bulk average temperature of the molten mass is brought to a temperature in the range of 60° C. to about 190° C. within a specified maximum period of time and, furthermore, maintaining the crystallizing mass at that bulk average temperature for a specified minimum period of time.

In a preferred embodiment, the glassy mass may be in the form of particles or pellets or the molten mass may be in the form of small portions or droplets.

This invention also concerns a process for the solid-state polymerization of poly(trimethylene terephthalate), wherein the improvement comprises, starting with poly(trimethylene terephthalate) having an average apparent crystallite size of 18.0 nm or more and an I.V. (intrinsic viscsosity) of 0.05 to 0.9 dl/g. Finally, a 3GT polymer product of a solid-state polymerization process is disclosed which product has an average apparent crystallite size of 18.0 nm or more and an I.V. of 0.5 dl/g or more.

DETAILS OF THE INVENTION

A novel process for producing poly(trimethylene terephthalate), also referred to as 3GT, is disclosed herein. A novel polymer composition characterized by a certain kind of crystalline morphology and other desirable characteristics is also disclosed. By 3GT or poly(trimethylene terephthalate) herein is meant poly(trimethylene terephthalate) which may be modified with small amounts, less than 10 mole percent, and more preferably less than 5 mole percent, of polymer repeat units derived from copolymerized monomers (or "co-repeat units"), so long as the crystallization behavior of the polyester is substantially the same as "homopolymer" 3GT.

The present 3GT has an average apparent crystallite size of about 18.0 nm or more, preferably 19.0 nm or more, more preferably about 20.0 nm to about 35 nm, which measurements are based on the 010 reflection. In particular, the average apparent crystallite size is measured by wide angle X-ray powder diffraction, the method or procedure for which is as follows.

Figure 1:
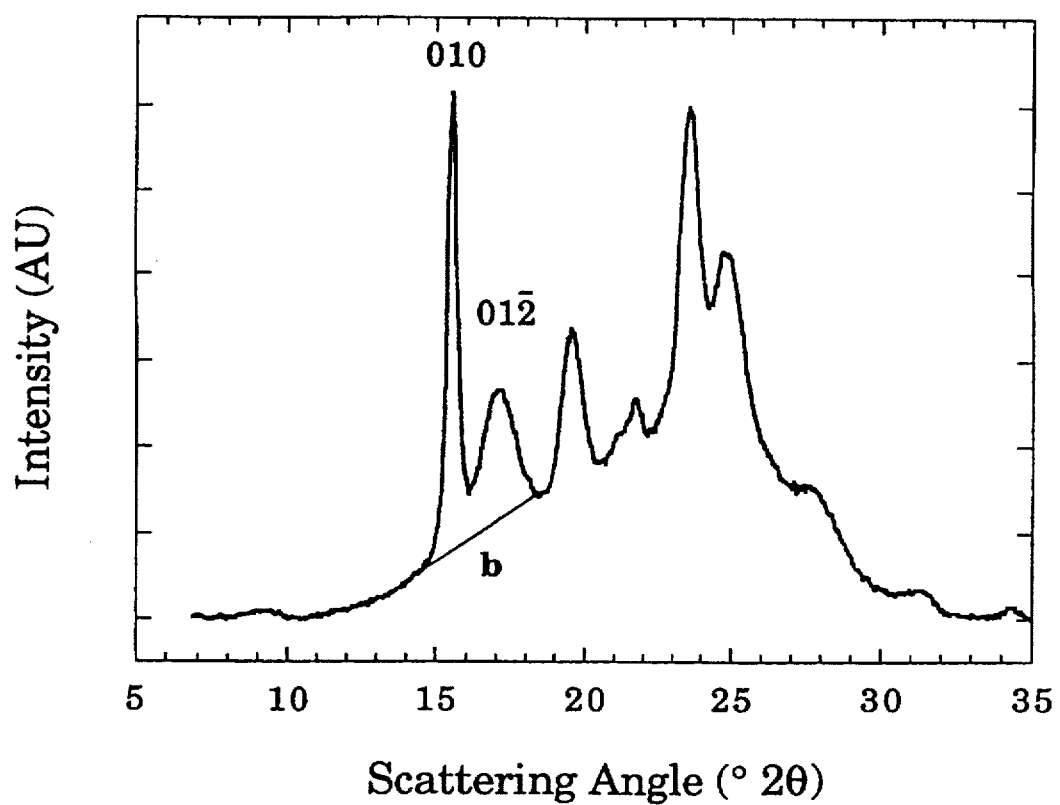
FIG. 1 is an illustration of a wide-angle x-ray diffraction pattern of a sample of 3GT polymer produced according to the present invention.
Figure 2:
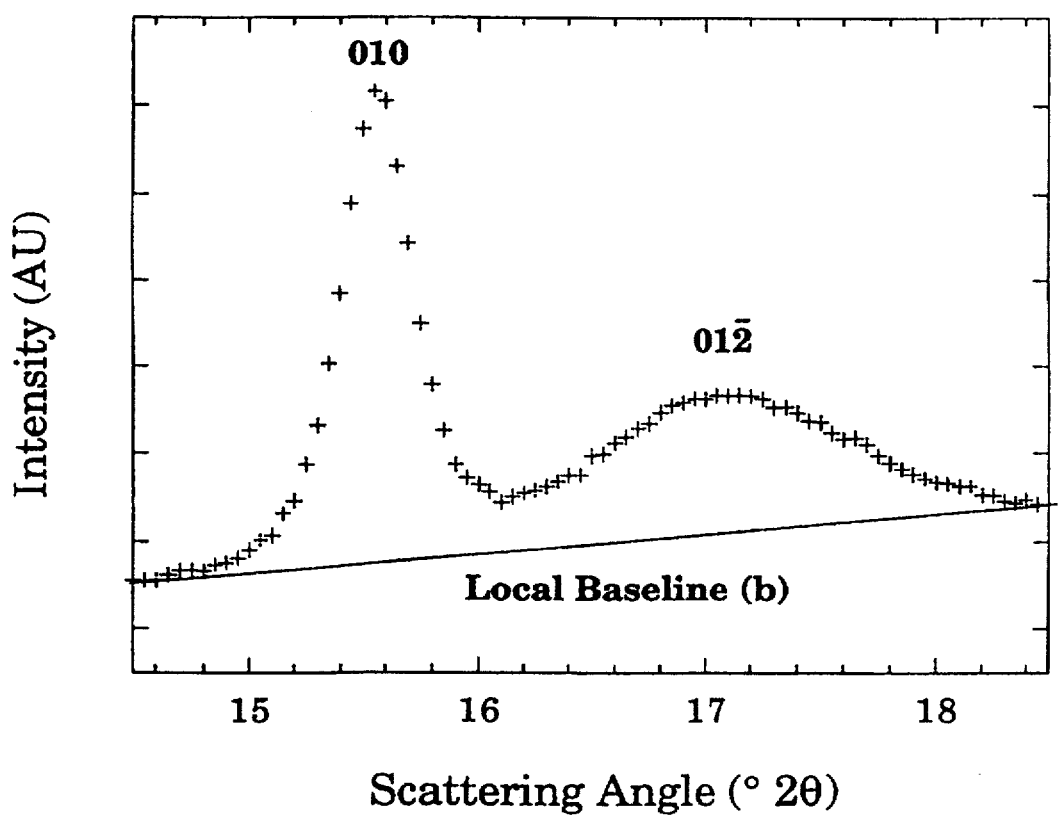
FIG. 2 is an illustration of the region of interest of the diffraction pattern shown in FIG 1.

Polymer samples of 3GT having uniform thickness for X-ray measurements are produced by cryogrinding the 3GT in a SPEX Freezer/Mill (Metuclhen, N.J.) under liquid nitrogen for 30 seconds and then compressing the 3GT into disks approximately 1 mm thick and 32 mm in diameter. While it is preferable that the sample's patterns are collected over the range 14.5°–18.5° 2θ (as shown in FIG. 2), the patterns of the samples can be collected over the range 10°–35° 2θ in some cases, as was obtained for some of the samples (as shown in FIG. 1). The diffraction data are collected using an automated Philips diffractometer operating in the transmission mode (CuKα radiation, curved diffracted beam monochrometer, fixed step mode (0.05°/step), 65 sec/step, 1° slits, sample rotating). Lorentz-polarization corrections are applied to each powder pattern.

To remove the local background scattering from the 14.5°–18.5° 2θ region of each powder pattern, a straight line extending from 14.5° to 18.5° 2θ is defined and subtracted, as shown in FIG. 2. This region of the diffraction pattern has been found to contain two crystalline reflections, at approximately 15.6° and 17.1° 2θ, that have been defined as the (010) and (01$\bar{2}$) reflections, referred to by S. Poulin-Dandurand, et al., in Polymer, Vol. 20, p.419–426 (1979).

FIGS. 1 and 2 show the diffraction patterns, corrected as detailed above, collected over the 2θ range 10°–35° and 14.5°–18.5°, respectively. In addition to the Miller indices of the reflections of interest, the local "artificial" background between 14.5° and 18.5° 2θ, labeled "b", and described above, is shown.

Figure 3:
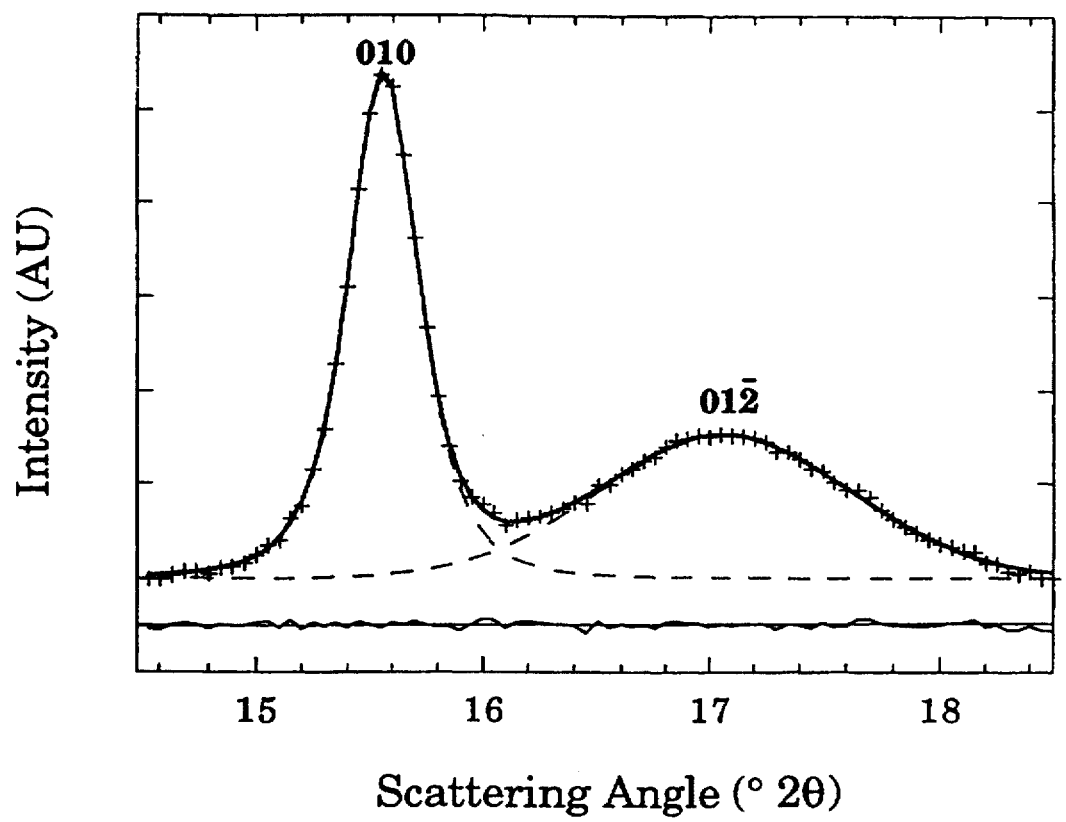
FIG. 3 is an illustration of the wide-angle X-ray diffraction pattern of FIG. 2 after being deconvoluted into two overlapping Pearson VII peaks.

The 14.5°–18.5°2θ region is then deconvoluted into two overlapping Pearson VII peaks corresponding to the two crystalline reflections, and the position, width, height, and exponential Pearson VII fitting parameters of both peaks are extracted. See Equation 2.3.3.16 on page 67 from the standard reference by A. J. C. Wilson, ed., *International Tables For Crystallography*, Vol. C, Published for The International Union of Crystallography by Kluwer Academic Publishers, Dordrecht (1992). An example of this deconvolution is shown in FIG. 3. Below the deconvoluted peaks is plotted the residuals, i.e., the observed minus calculated intensity as a function of the scattering angle. The apparent crystallite size for the (010) reflection (herein sometimes also referred to simply as apparent crystallite size), $ACS_{010}$, is calculated from the reflection's position and full width at half height using the Scherrer equation, as for instance described by L. E. Alexander, *X-Ray Diffraction Methods in Polymer Science*, p. 335 et seq. (John Wiley & Sons, New York, 1969):

$$ACS_{010} = \frac{K\lambda}{\beta_{010}\cos\theta_{010}}$$

where $ACS_{010}$ is the mean dimension of the crystal, K is assumed to be 1.0, λ is the wavelength, β is the full width at half height of the profile, in radians, and θ has its normal meaning.

By the term "average" with respect to apparent crystallite size is meant the numerical average of one or more (preferably 3 or more) measurements on the same batch of polymer. Such multiple measurements may be used to insure reproducibility because of the relatively small sample size used in the X-ray measurement.

It is also preferred if the 3GT has no distinct premelting endotherm. By a "premelting endotherm" is meant an endothermic peak in the DSC due to a melting endotherm at a lower temperature than (before) the main melting endotherm. By "distinct" is meant the melting occurs over a temperature range of 70° C. or less, preferably less than 50° C. By having "no distinct premelting endotherm" is meant that if one or more such endotherms are detected, the total heat of fusion is less than 1 J/g, preferably less than 0.5 J/g. Premelting endotherms are believed to be indicative of small and/or relatively imperfect crystallites, and when present, the 3GT particle may have a tendency to more readily stick to other particles when heated, usually at or around the temperature of a premelting endotherm, which is very undesirable in solid-state polymerization.

The 3GT of the present invention, as a starting material for solid-state polymerization of poly(trimethylene terephthalate), has an average apparent crystallite size of 18.0 nm or more and an I.V. (intrinsic viscosity) of 0.05 to 0.9 dl/g, preferably about 0.1 to about 0.5 dl/g. The 3GT polymer product of a solid-state polymerization process according to the present process has an average apparent crystallite size of 18.0 nm or more and an I.V. of 0.5 or more, preferably about 0.7 to about 2.0 dl/g.

The 3GT of the present invention may be made, as indicated above, by rapidly heating glassy 3GT to a certain temperature range or by cooling molten 3GT to that same temperature range. By "glassy 3GT" is meant 3GT below its $T_g$ that contains a quantity of crystalline material that produces a heat of fusion, in a DSC measurement, of less than about 10 J/g, preferably less than about 5 J/g, and most preferably less than 1 J/g. The amount of crystalline 3GT present can be determined by using a standard DSC method heating at 10° C./min to determine the heat of fusion of the crystallites present. Since the 3GT sample will be mostly amorphous, an exothermic crystallization peak will occur in the DSC trace as well as an endothermic melting peak. The crystallinity of the starting material, given in J/g, is determined by taking the difference in the areas under the curves of the two peaks. By a "molten 3GT" is meant a 3GT in the liquid (not glassy) state. Preferably, it contains less than ten weight percent (10%), more preferably less than five weight percent (5%), and most preferably less than one weight percent (1.0%) crystalline 3GT. It is preferred if the initial temperature of the molten 3GT is about 230° C. or higher, preferably about 240° C. or higher, since this is approximately at or above the common melting point of 3GT. In order to obtain a large apparent crystallite size, it is preferred to have as little crystallinity in the starting 3GT as possible.

It has been found that the desired 3GT crystalline morphology may be formed by rapidly heating or cooling amorphous 3GT to a preselected temperature range, which process step may be referred to as thermal shock crystallization. A temperature range of 60° C. to about 190° C. has been found to produce the desired result; 80° C. to 170° C. is preferred for maximum crystallization rate of 3GT.

Accordingly, in this process, not only must a temperature gradient be imposed between the 3GT and its surroundings, but heat (or another appropriate form of energy) should be removed or added to the polymer at a relatively high rate. If heating, conductive and/or radiant heat as obtained in conventional ovens may be employed. For example, ovens in which heat flows primarily by radiation and/or conduction from the surroundings into the 3GT material or particle may be employed.

This requires that the surroundings or environment of the 3GT be able to transfer this heat rapidly. Preferably, the cross-sectional area of the mass of 3GT should not be so large that the change of temperature of the 3GT is relatively rapid on the surface of the mass but inadequate or too slow in the center.

When crystallizing from molten 3GT, in order to obtain rapid heat transfer into the molten 3GT, it is preferred if the 3GT is in good contact with a heat-transfer material that has a relatively high overall heat capacity (derived from both its mass and its actual heat capacity) and thermal conductance. Metals are particularly useful for this purpose, especially metals with high coefficients of heat transfer. However, coated metals, plastics and other materials may be employed for transfering heat to molten 3GT during crystallization.

The surface of the molten 3GT may be exposed to a combination of heat transfer materials, for example, a part of the surface may be exposed to a metal surface and another part of the surface may be exposed to, for example, a gas. Although a gas may be used to transfer heat to or from the 3GT, the heat capacities of gases are relatively low, and so such cooling would be more difficult to achieve by itself. Liquids at the appropriate temperature may also be used, but they may be less preferred because of concerns that contamination may occur and because of the need to separate the liquid from the 3GT. Thus, it is preferred to at least partially cool the molten 3GT by contact with a heat conductive solid.

Conversely, when starting with glassy 3GT instead of molten 3GT, the glassy 3GT should be rapidly heated instead of cooled. One way to accomplish this is to expose the glassy 3GT to a very high temperature environment, about 300° C. to 800° C. or higher for up to about 120 seconds. Generally speaking, the higher the temperature or the smaller the cross section of the 3GT being treated, the less time that will be needed. In forming the desired crystalline form of 3GT by heating or cooling, it is preferred that the entire crystallization process, i.e., heating or cooling and crystal formation, be complete in less than 5 min, more preferably less than 3 min, more preferably less than 2 min, and most preferably about 3 to about 60 sec. When crystallizing molten 3GT, the particles may be maintained at the temperature of crystallization for longer periods of time. When crystallizing glassy 3GT, however, prolonged exposure to the temperature of crystallization may be detrimental to the desired result.

The maximum linear distance from any point in a particle to its surface is used to determine how fast the bulk of the 3GT is heated or cooled. Generally, it is preferred if the maximum linear distance for the 3GT particles to be heated or cooled is about 1 cm or less, more preferably, about 0.6 cm or less.

The shape of the crystallized 3GT may vary, and may be, for example, a film, a ribbon or particles of various shapes. In one preferred embodiment, the 3GT is in the form of particles (or, more accurately, small discrete units, masses, or droplets in the case of molten 3GT). Crystalline 3GT in the form of particles is particularly useful in solid-state polymerization. The particles herein have average diameters of 0.05 cm to 2 cm. Preferred forms and/or sizes for particles are spherical particles with diameters of 0.05 cm to 0.3 cm, hemispherical particles with a maximum cross section of 0.1 cm to 0.6 cm, or right circular cylinders with a diameter of 0.05 cm to 0.3 cm and a length of 0.1 cm to 0.6 cm. If shapes such as films or ribbons are formed, then if desired, they can be later ground, cut, or otherwise divided into particles, such as are suitable for solid-state polymerization. Since it is preferred if the pellets are produced on an economically advantageous commercial scale, the pellets would preferably be produced and collected together in commercial quantities of greater than 10 kg, more preferably greater than 50 kg. The pellets may be used in the same plant soon after being made, stored for later use, or packaged for transport, all in commercial quantities.

Before reaching a stable shape, molten or crystallizing 3GT may be affected by the shape of the means into which it can flow or within which it is confined before solidification, whether such means employs physical or other forces.

Glassy 3GT, for use as a starting material in a crystallization process according to a method of the present invention, may be made by very rapidly cooling the appropriate molecular weight molten 3GT to below the glass transition temperature of 3GT. This can be done in bulk or while forming particles of the 3GT. The 3GT itself can be made from appropriate methods known to the artisan. See, for example, British Patent 578,097. Also, methods for preparing PET (2GT) may, to a large extent, be applicable to 3GT. See, for example, with respect to PET polyester, B. Elvers, et al., Ed., *Ullmann's Encyclopedia of Industrial Chemistry*, Vol. A 21, p. 232–237 (VCH Verlagsgesellschaft mbH, Weinheim 1992). Such a glassy polymer may be stored or shipped (preferably in a relatively dry state) for later polymerization to higher molecular weight, whether a solid-state polymerization, melt polymerization, or other processing.

It is preferred if the instant process starts with molten 3GT, which is then cooled. It is convenient, and therefore preferred, if the 3GT is formed into "particles" just before or essentially simultaneous with the cooling of the molten 3GT to form the desired crystalline morphology. The preferred eventual sizes and shapes of such particles are as given above.

The molten 3GT may be formed into particles by a variety of methods, including pastillation, see copending commonly assigned application U.S. Ser. No. 08/376,599; and U.S. Pat. No. 5,540,868, these applications hereby incorporated by reference in their entirety, or U.S. Pat. No. 5,340,509, prilling as desribed in numerous patents such as U.S. Pat. No. 4,165,420, melt cutting, dripping (see Examples 1–5 below), or extruding (see Comparative Examples 7–9 for an extrusion step).

Pastillation, broadly termed, is employed for particle formation in a preferred embodiment of the present invention. Pastillation typically employs an outer, rotating, cylindrical container having a plurality of orifices circumferentially spaced on its periphery. Within the outer container is an inner, coaxial, cylindrical container having a metering bar or channel. The plurality of orifices on the outer container are disposed such that they will cyclicly align with the metering bar or channel on the inner container when the outer container is rotated.

Typically, molten polyester is transferred to the inner container of the pastillator and, under pressure, is dispensed onto a surface such as a conveyor belt in uniform amounts, forming droplets or unsolidified pellets, as each of the plurality of orifices on the outer container align with the metering bar on the inner container. Pastillators are commercially available, e.g., the ROTOFORMER® pastillator manufactured by Sandvik Process Systems (Totowa, N.J.). For more details on forming polyester particles by pastillation, see copending, commonly assigned and copending application Ser. No. 08/376,599.

The 3GT, as droplets, can be conveniently cooled by contacting them with a metal surface, preferably in a controlled temperature environment, such as a conveyor belt or moving table held at the proper temperature to achieve the desired crystalline morphology. It is preferred if the 3GT initially contacts this metal while still largely molten, since a liquid will usually provide better heat transfer than a solid of the same material. A regulated flow of an inert gas may be passed over the particles to increase the overall rate of cooling.

The temperature to which the 3GT mass (or pellet) is brought, referred to above, is the bulk average temperature, defined as the average temperature of the mass (or pellet) or the average of the temperature in every location of the mass (or pellet). To determine the bulk average temperature of pellets, for example, the measurement of bulk average can proceed as follows. Quickly collect a sample of the pellets from the solid surface or gas, whichever is used to thermally shock the pellets. Immediately place the pellets in an insulated container, preferably evacuated. Preferably, the pellets nearly fill the container. Insert a thermocouple. Allow the container to come to an equilibrium temperature and record it as the bulk average temperature.

Alternately, a bulk average temperature of pellets being processed can be calculated as follows. Collect a sample of the pellets. Immediately place the pellets in a preweighed amount of distilled water, at a known temperature, in a preweighed insulated container. Reweigh the the total mass. Observe the equilibrium temperature. Calculate the bulk average temperature of the pellets based on the following equation:

$$(m_w) \times (c_{pw}) \times (T_e - T_w) = (m_p) \times (c_{pp}) \times (T_p - T_e)$$

wherein $m_w$ is the mass of the water, $c_{pw}$ is the heat capacity of the water, $m_p$ is the mass of the pellets, $c_{pp}$ is the heat capacity of the pellets, $T_e$ is the equilibrium temperature, and $T_w$ is the initial temperature of the water, and X represents multiplication. This equation can be solved to determine $T_p$, the bulk temperature of the pellets.

As will be appreciated by one of ordinary skill in the art, the bulk average temperature of the pellets, under various conditions, can be estimated with a reasonable degree of accuracy and precision based on standard heat transfer equations. The skilled artisan will be familiar with such calculations, including numerical and/or computer techniques for improved efficiency and accuracy.

For example, if one knows the heat transfer coefficient of the environment and the process conditions, then an estimate of the change in bulk average temperature of the particle with time can be obtained from the equations:

$$Q = m_p c_p \frac{dT_p}{dt} = hA(T_e - T_p)$$

$$\frac{dT_p}{dt} = \frac{hA}{m_p c_p}(T_e - T_p)$$

$$\frac{dT_p}{dt} = kT_e - kT_p$$

where $k = \frac{hA}{m_p c_p}$ $$\int_{T_{p0}}^{T_p} \frac{dT_p}{T_e - T_p} = \int_0^t k\,dt$$

$$-\mathrm{Ln}\left(\frac{T_e - T_p}{T_e - T_{p0}}\right) = kt$$

$$T_e - T_p = (T_e - T_{p0})(e^{-kt})$$

$$T_p = T_{p0}(e^{-kt}) + T_e(1 - e^{-kt})$$

This equation indicates that if the heat transfer constant, k, is known for a given system as well as the initial temperature of the particle and the temperature of the environment, then the bulk average temperature of the particle as a function of time can be calculated wherein $m_p$ is the mass of the pellet, $c_p$ is the heat capacity of the pellet, t is time, h is the heat transfer coefficient of the surface or gas to which the pellet is subjected, $T_e$ is the temperature of the surface or gas to which the pellet is subjected, and A is the area which is contacted or subjected to the heat source, whether a solid surface or a gas. For example, a hemispherical particle dropped on a steel belt may have a flat area A in touch with the belt, which area can be readily estimated as $(\pi)(\text{radius})^2$. Alternatively, an average value A of a sample of pellets can be physically measured for use in the above equations. These equations can be solved for $T_p$, the bulk average temperature of the pellet.

As mentioned above, thermal shock can be imposed on 3GT pellets so that the temperature gradient experienced by the pellets occurs in either direction, that is as a result of either heating or cooling. However, it is preferable that the pellets be crystallized by cooling from the melt. This avoids the need to reheat cooled particles and is thus more energy efficient.

In an integrated process for producing high molecular weight 3GT, the low molecular weight 3GT having the morphology described above may be further polymerized to higher molecular weight. The 3GT may be melted and melt polymerized, but the crystalline 3GT described herein is especially suitable for use in solid-state polymerization. Solid-state polymerization in general is well known to the artisan. See, for instance, F. Pilati in G. Allen, et al., Ed., *Comprehensive Polymer Science*, Vol. 5, p. 201–216 (Pergamon Press, Oxford 1989). In general, solid-state polymerization involves heating particles of a polymer to a temperature below the melting point and passing a dry gas, usually nitrogen, usually concurrently in continuous operation, around and over the particles. At the elevated temperature, transesterification and polycondensation reactions proceed, and the gas can be employed to carry away the volatile products (similar other methods, such as employing a vacuum, may be used for this purpose), thereby driving higher the molecular weight of the polymer. Some embodiments employ both an inert gas flow and a vacuum.

In the past, a number of problems or difficulties have been associated with the solid-state polymerization of some polyesters such as PET. In particular, the particles to be polymerized usually have had to undergo an annealing or crystallization process, so that when they are heated during solid-state polymerization, they do not undergo partial melting and stick together. If, alternatively, the polymerization occurs at a relatively lower temperature to avoid sticking, this would increase the polymerization time, since the reactions which drive the molecular weight up proceed faster at higher temperatures. In either event, these difficulties or problems tend to make the solid-state polymerization process more expensive to run.

Advantageously and surprisingly, the 3GT polymer with the crystalline morphology disclosed herein does not need additional prolonged crystallization steps after the initial crystallization, and may be more directly polymerized (preferably without prolonged annealing). In addition, particles produced according to the present process may, in some cases at least, be more resistant to attrition. This would usually be advantageous where polymer particles, in solid-state polymerization apparatus, tend to wear against each other or the apparatus itself.

In any polymerization of low molecular weight 3GT to higher molecular weight 3GT, normal additives, such as polymerization catalysts, may be present. These may have been added when the low molecular weight 3GT was formed. Catalysts containing titanium, antimony, or lanthanum are commonly used in transesterification and polycondensation of polyesters.

In the following Examples, certain analytical procedures are used. Aside from X-ray diffraction, which is described in detail above, these procedures are described below. References herein to these types of analyses, or their results, correspond to these exemplary procedures.

Intrinsic Viscosity (I.V.)

A solvent is made by mixing one weight portion trifluoroacetic acid and one weight portion methylene chloride. The 3GT polymer, in the amount of approximately 0.01 g, is weighed into a clean 30 ml vial. Appropriate quantity of solvent is added to make a 0.4% by weight solution. The vial is sealed (to prevent evaporation of the solvent) and shaken for 2 hours or until polymer dissolves. The solutions are measured in duplicate on a Viscotek® Y 501B force flow viscometer at 19° C. with a pure methylene chloride reference stream. A three point calibration scheme with blank correction is used to calculate single point intrinsic viscosity (I.V.) using the standard Viscotek® ETA 4.10 software package.

Melting Point

Melting point was determined by Differential Scanning Calorimetry (DSC) and all samples were analyzed using a TA Instruments DSC 910. The instrument was calibrated with indium consistent with the system documentation. The samples were analyzed as received, no pre-grinding, using 5–10 mg ±0.005 mg. The samples were sealed in aluminum pans then heated from room temperature to 300° C. at 10°C./min. in a nitrogen purged environment. Glass transition temperature, melting point temperature and heat of fusion calculations were done with the TA Instrument software. The reported DSC peak melting temperature is the corresponding temperature of the peak in the main melting endotherm.

In the Examples that follow, SSP means solid-state polymerization.

EXAMPLES 1–5

These Examples 1–5 illustrate crystallization of 3GT from molten droplets according to one embodiment of the present invention. The polymer 3GT was polymerized in the melt from dimethyl terephthalate (DMT) and 1,3-propanediol (3G) to the intrinsic viscosity listed in Table 1 below. This low molecular weight polymer was heated in a melt indexer at 270° C. until the polymer dripped out of its orifice (1 mm in diameter) under its own weight onto a programmable hot plate approximately 20 cm below. The hot plate was set to 135° C. Crystallization was monitored by observing the clear amorphous drop turn into an opaque solid. Once it was opaque, the surface was tipped at an angle to horizontal so the particle would slide off and cool to room temperature. The particles were shaped like pancakes, approximately 5 mm in diameter and 2.5 mm thick. DSC analysis of the crystallized samples indicated no pre-melting endotherms. The intrinsic viscosities and the average apparent crystallite sizes determined from the 010 reflection are shown in Table 1 below.

TABLE 1

| Ex. No. | I.V. (dl/g) | $ACS_{010}$ (nm) Pearson VII Deconvolution | $ASC_{010}$ (nm) Gaussian Deconvolution* |
|---|---|---|---|
| 1 | 0.16 | 21.6 | |
| 2 | 0.18 | 19.7 | |
| 3 | 0.35 | 19.7 | |
| 4 | 0.50 | 20.9 | 20.5 |
| 5 | 0.70 | 20.5 | 19.5 |
| 6 | 0.89 | 23.2 | 2.15 |

*Numbers obtained using Gaussian deconvolution may vary (usually within about 5%) from what would be obtained using Pearson VII deconvolution.

EXAMPLE 6

This Example shows that the novel crystalline morphology created by the thermal shock crystallization was preserved when the low molecular weight prepolymer was solid-state polymerized to higher molecular weight. Particles from Example 2 above, with an I.V. of 0.18 dl/g, were solid-state polymerized for 24 hr at 205° C. The SSP batch unit consisted of a metal tube (23.5 mm diameter, 19 cm long) with a mesh screen on the botton. Nitrogen, preheated to the set temperature, heated the outside of the tube and went up through the screen heating the particles. The SSP'd particles had an I.V. of 0.89 dl/g and an $ACS_{010}$ of 21.5 nm using Gaussian deconvolution.

COMPARATIVE EXAMPLES 7–9

The polymer 3GT was made by a conventional method for making 2GT (PET) in order to show that this material does not have the novel crystalline form shown in Examples 1–6. The samples listed in Table 2 below were polymerized in the melt from DMT and 1,3-propanediol to an I.V. of about 0.7–0.9 dl/g. The polymer was extruded under slight pressure, round strands, ⅛ inch diameter, into a quenching water bath and cut into lengths about ⅛ inch long. The polymer chips were shattered, then crystallized for 6 hr in a vacuum oven at 125° C. The crystallized chips were solid-state polymerized in a fluidized bed using dry insert gas (nitrogen). The temperature was ramped from 190° C. to 210° C. in 10° C. steps and kept at 210° C. until the desired molecular weight was obtained. Sample 8 also contained 0.3% $TiO_2$. The intrinsic viscosities and the average apparent crystallite sizes determined from the 010 reflection are shown in Table 2 below.

TABLE 2

| Ex. No. | I.V. (dl/g) | $ACS_{010}$ (nm) Pearson VII Deconvolution |
|---|---|---|
| 7 | 1.06 | 16.1 |
| 8 | 1.14 | 16.9 |
| 9 | 1.39 | 15.7 |

What is claimed is:

1. A composition, comprising modified or unmodified poly(trimethylene terephthalate) having an average apparent crystallite size of about 18.0 nm or more, determined from 010 reflection.

2. The composition as recited in claim 1 wherein said average apparent crystallite size is about 19.0 nm or more.

3. The composition as recited in claim 1 wherein said average apparent crystallite size is about 20.0 nm or more.

4. The composition as recited in claim 1 wherein the composition has an intrinsic viscosity of 0.05 to 2.0 dl/g.

5. The composition as recited in claim 1 wherein said modified poly(trimethylene terephthalate) comprises up to 5 percent of repeat units other than trimethylene terephthalate repeat units.

6. The composition as recited in claim 1 wherein said modified poly(trimethylene terephthalate) comprises repeat units derived from comonomers selected from the group consisting of isophthalic acid, triethylene glycol, 1,4-cyclohexane dimethanol, 2,6-naphthalene dicarboxylic acid, adipic acid, esters of the foregoing, diethylene glycol, and mixtures thereof.

7. Particles of the composition of claim 1.

8. The particles as in claim 7 having an average diameter of 0.05 cm to 2 cm.

9. The particles as recited in claim 7 or 8 wherein said average apparent crystallite size is about 19.0 nm or more.

10. The particles as recited in claim 7 or 8 wherein said average apparent crystallite size is about 20.0 nm or more.

11. The particles as recited in claim 7 or 8 comprised of poly(trimethylene terephthalate) having an intrinsic viscosity of 0.5 to 2 dl/g.

12. The particles as recited in claim 11 wherein the intrinsic viscosity is 0.7 to 2 dl/g.

13. The particles as recited in claim 7 or 8, wherein the particles are spherical, hemi-spherical, cyclindrical, or pancake-like in shape.

14. The particles of claim 13 wherein the particles are spherical with a diameter of 0.05 cm to 0.3 cm.

15. The particles of claim 13 wherein the particles are hemispherical with a maximum cross section of 0.1 cm to 0.6 cm.

16. The particles of claim 13 wherein the particles are right circular cylinders with a diameter of 0.05 cm to 0.3 cm and a length of 0.1 cm to 0.6 cm.

17. A process for crystallizing poly(trimethylene terephthalate), comprising cooling at a rate sufficient to cool a molten poly(trimethylene terephthalate), or heating at a sufficient rate to heat a glassy poly(trimethylene terephthalate), to a temperature of about 60° C. to about 190° C., to produce a crystalline poly(trimethylene terephthalate) having an average apparent crystallite size of about 18.0 nm or more as determined from 010 reflection.

18. The process as recited in claim 17 wherein said temperature is about 80° C. to about 170° C.

19. The process as recited in claim 17 wherein said average apparent crystallite size is about 19.0 mn or more as determined from 010 reflection, and said crystalline poly(trimethylene terephthalate) produced has an intrinsic viscosity of about 0.05 to 0.9 dl/g.

20. The process as recited in claim 17 wherein said crystallizing is carried out in about 5 minutes or less.

21. The process as recited in claim 17 wherein said poly(trimethylene terephthalate) produced is in the form a particle.

22. The process as recited in claim 17 comprising the additional step of solid-state polymerization of said crystalline poly(trimethylene terephthalate).

23. A process for the solid-state polymerization of poly(trimethylene terephthalate), comprising heating particles of poly(trimethylene terephthalate) in an inert gas flow or vacuum or an inert gas flow and vacuum to above their Tg but below their melting point, the improvement comprising starting with poly(trimethylene terephthalate) particles having an average apparent crystallite size of about 18.0 nm or more and an intrinsic viscosity of about 0.05 to 0.9 dl/g.

24. The process as recited in claim 23 wherein said average apparent crystallite size is about 19.0 nm or more.

25. The process as recited in claim 23 wherein said average apparent crystallite size is about 20.0 nm or more.

* * * * *